United States Patent Office 3,728,297
Patented Apr. 17, 1973

3,728,297
PYRAZOLYL ESTERS OF PHOSPHORIC ACIDS
Hellmut Hoffmann, Wuppertal-Elberfeld, Ingeborg Hammann, Cologne, and Gunter Unterstenhofer, Opladen, Germany, assignors to Farbenfabriken Bayer Aktiengesellschaft, Leverkusen, Germany
No Drawing. Filed Aug. 17, 1970, Ser. No. 64,668
Claims priority, application Germany, Aug. 21, 1969, P 19 42 561.7
Int. Cl. C07f 9/08, 9/16, 9/38
U.S. Cl. 260—310 R       7 Claims

ABSTRACT OF THE DISCLOSURE 1-methyl-4-cyano - 5 - methylmercapto-pyrazol-(3)-yl esters of O,O-dialkyl-phosphoric acids or O-alkyl-alkanephosphonic acids or mono- or di-amides of phosphoric or phosphonic acids or their thiono analogues, having the formula $$\underset{R'}{\overset{RY}{\underset{\|}{P}}}\overset{X}{\underset{\|}{P}}-O-\underset{N-N-CH_3}{\overset{CN}{\underset{}{\bigg\langle}}}-SCH_3 \quad (I)$$

in which

R denotes a straight-chain or branched alkyl radical,
R' denotes a straight-chain or branched alkyl radical or an alkoxy, alkylamino or dialkylamino radical,
Y denotes an oxygen atom or an imino or alkylimino group, and
X denotes an oxygen or sulphur atom, the alkyl radicals of R, R' and Y having from 1 to 6 carbon atoms, which possess arthropodicidal, especially acaricidal and insecticidal, and in some cases rodenticidal, properties and process for their preparation.

---

The present invention relates to and has for its objects the provision of particular new 1-methyl-4-cyano-5-methyl-mercapto-pyrazol-(3)-yl esters of O,O-dialkyl-phosphoric acids or O-alkyl-alkanephosphonic acids or mono- or di-amides of phosphoric or phosphonic acids or their thiono analogues, which possess arthropodicidal, especially insecticidal and acaricidal, and in some cases rodenticidal, properties, active compositions in the form of mixtures of such compounds with solid and liquid dispersible carrier vehicles, and methods for producing such compounds and for using such compounds in a new way especially for combating pests, e.g. arthropods, especially insects and acarids, and sometimes rodents, with other and further objects becoming apparent from a study of the within specification and accompanying examples.

From U.S. patent specification 2,754,244, it is known that certain methylpyrazolyl esters of phosphoric and thionophosphoric acids possess insecticidal and acaricidal properties.

The present invention provides pyrazolyl esters of phosphoric, thionophosphoric, phosphonic and thionophosphonic acids, which esters have the formula $$\underset{R'}{\overset{RY}{\underset{\|}{P}}}\overset{X}{\underset{\|}{P}}-O\underset{N-N-CH_3}{\overset{CN\ SCH_3}{\underset{}{\bigg\langle}}} \quad (I)$$

in which

R denotes a straight-chain or branched alkyl radical,
R' denotes a straight-chain or branched alkyl radical or an alkoxy, alkylamino or dialkylamino radical,
Y denotes an oxygen atom or an imino or alkylimino group, and
X denotes an oxygen or sulphur atom, the alkyl radicals of R, R' and Y having from 1 to 6 carbon atoms.

The compounds of Formula I exhibit strong insecticidal, acaricidal, and, in some cases, rodenticidal, properties.

The present invention also provides a process for the production of the pyrazolyl esters of Formula I in which a phosphoric, thionophosphoric, phosphonic or thionophosphonic acid ester halide of the general formula $$\underset{R'}{\overset{RY}{\underset{\|}{P}}}\overset{X}{\underset{\|}{P}}-Hal \quad (II)$$

in which

R, R', Y and X have the meanings given above, and
Hal denotes a halogen, preferably a chlorine, atom, is reacted with (a) 1-methyl-3-hydroxy-4-cyano-5-methyl-mercapto pyrazole of the formula $$HO-\underset{\underset{CH_3}{N}}{\overset{}{\bigg\langle}}\underset{SCH_3}{\overset{CN}{}} \quad (IIIa)$$

in the presence of an acid-binding agent, or (b) a salt of the hydroxypyrazole of the Formula IIIa.

Surprisingly, the pyrazolyl esters according to the present invention are distinguished by a considerably higher insecticidal and acaricidal activity than the known methylpyrazolyl phosphoric and thionophosphoric acid esters of analogous constitution and the same direction of activity. The compounds according to the invention therefore represent a genuine enrichment of the art.

If, for example, O,O-diethylthionophosphoric acid diester chloride and 1-methyl-3-hydroxy-4-cyano-5-methyl-mercaptopyrazole are used as the starting materials, the reaction course can be represented by the following equation:

$$(C_2H_5O)_2\overset{S}{\underset{\|}{P}}-Cl + HO-\underset{\underset{CH_3}{N}}{\overset{}{\bigg\langle}}\underset{SCH_3}{\overset{CN}{}} \xrightarrow[-HCl]{\text{acid-binding agent}}$$

(II)             (IIIa)

$$(C_2H_5O)_2\overset{S}{\underset{\|}{P}}-O-\underset{\underset{CH_3}{N}}{\overset{}{\bigg\langle}}\underset{SCH_3}{\overset{CN}{}}$$

(I)

The starting materials to be used for the preparative process are defined generally by the Formulae II and IIIa. In Formulae I and II, R preferably stands for a straight-chain or branched alkyl radical with 1 to 4 carbon atoms, that is methyl, ethyl, n- or iso-propyl, n-, iso-, sec.- or tert.-butyl. R' preferably denotes a straight-chain or branched alkyl radical with 1 to 4 carbon atoms or an alkoxy, alkylamino or dialkylamino group with 1 to 4 carbon atoms in each alkyl group. When Y is an alkylamino group its alkyl groups have from 1 to 4 carbon atoms.

As examples of phosphoric, thionophosphoric, phosphonic and thionophosphonic acid ester halides of the Formula II there may be mentioned:

O,O-dimethyl-, O,O-diethyl-, O,O-dipropyl-, O,O-di-isopropyl-, O-methyl-O-ethyl-, O-methyl-O-isopropyl-, O-ethyl-O-isopropyl-phosphoric acid ester chloride or the thiono analogues;

O-methyl-methane, O-ethyl-propane, O-isopropyl-ethane-, O-butyl-methane-phosphonic acid chloride and the corresponding thiono compounds;

N,O-dimethyl-, O-methyl-N-ethyl-, O-methyl-N-isopropyl-, O-ethyl-N-isopropyl-, N,O-di-ethyl-, O-propyl-N-methyl-, O-isopropyl-N-methyl-, N,N-O-trimethyl-, O-methyl-N,N-diethyl-, O-methyl-N,N-di-isopropyl-, O-ethyl-N,N-dimethyl-, N,N-O-triethyl-, O-ethyl-N,N-di-isopropyl-, O-isopropyl-N,N-dimethyl-, N,N-O-tri-isopropyl-phosphoric acid ester amide chloride and the thiono analogues; and bis-(N,N-di-methyl)-, -(N,N-diethyl)-, -(N,N-di-isopropyl)-, -(N,N-dibutyl)-, -(N-methyl)-, -(N-ethyl)-, -(N-isopropyl)-, -(N-butyl)-phosphoric acid diamide chloride and their thiono analogues.

The phosphoric, thiono phosphoric, phosphonic and thionophosphonic acid ester halides of the Formula II required as starting materials are known from the literature and, like the pyrazole derivative of the Formula IIIa, are readily obtainable even on an industrial scale.

The preparative process is preferably carried out with the use of a suitable solvent or diluent. As such, practically all inert organic solvents are suitable. These include, in particular, aliphatic and aromatic hydrocarbons which may be chlorinated, such as benzene, toluene, xylene, benzine, methylene chloride, chloroform, carbon tetrachloride, chlorobenzine; ethers, for example diethyl and dibutyl ether, dioxans; ketones for example, acetone, methylethyl ketone, methylisopropyl ketone and methylisobutyl ketone; and nitriles, such as acetonitrile.

As the acid-binding agent any customary acid acceptor may be used. Particularly good results have been obtained with alkali metal carbonates and alcoholates, such as sodium and potassium carbonates, methylates and ethylates; furthermore, aliphatic, aromatic or heterocyclic amines, for example, triethylamine, dimethylamine, dimethylaniline, dimethylbenzylamine and pyridine, may also be employed.

The reaction temperature can be varied within a fairly wide range. In general, the work is carried out at 40° to 120° C., preferably at 75° to 85° C.

The reaction is, in general, carried out at normal pressure.

In the process, the starting materials are, in most cases, used in equimolar proportions. An excess of one or the other of the reactants brings no substantial advantages.

The reaction is preferably effected in the presence of one of the above-mentioned solvents and, if necessary, an acid acceptor at a temperature within the stated preferred range. After several hours stirring — optionally with heating—the reaction mixture is poured into water, taken up with a hydrocarbon, preferably benzene, and worked up according to customary methods.

The products according to the invention are obtained in most cases in the form of colorless to slightly yellow-colored, viscous, water-insoluble oils which cannot be distilled without decomposition but which can, by so-called "slight distillation", that is by heating to moderately elevated temperatures under reduced pressure for a sufficiently long period, be freed from the last volatile components and thereby purified. Their refractive indices serve for their characterization.

As already mentioned the new pyrazolyl phosphoric, thionophosphoric, phosphonic and thionophosphonic acid esters are distinguished by outstanding insecticidal and acaricidal effectiveness against plant pests, household pests and pests of stored products. They possess activity against both sucking and biting insects and mites (Acarina). At the same time, they exhibit only a slight phytotoxicity and have, in some cases, rodenticidal properties also.

For these reasons, the compounds according to the invention may be used with success as pesticides in crop protection and the protection of stored products as well as in the hygiene field. Furthermore, they can be used for the control of ectoparasites in veterinary medicine.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further cicadas, such as *Euscelis bilobatus* and *Nephotettix bipunctatus*; and the like.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleriae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Para-*

*tetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against household pests and pests of stored products, particularly flies and mosquitoes, the compounds of the present invention are also distinguished by an outstanding residual activity on wood and clay as well as good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especialy chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1% by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weghit of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexepected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*.)

After the specified periods of time, the degree of destruction is determined as a percentage: 100% means that all the caterpillars are killed whereas 0% means that none of the caterpillars are killed.

The active compounds, the concentrations of the active compounds, the evaluation time and the results can be seen from the following Table 1.

TABLE 1
Plutella Test

| Active compound (constitution) | Concentration of active compound in percent | Degree of destruction in percent after 3 days |
|---|---|---|
| (A) $(CH_3O)_2P(S)-O-$[3-methyl-pyrazol-5-yl] (known) | 0.1 | 0 |
| (B) $(C_2H_5O)_2P(S)-O-$[3-methyl-pyrazol-5-yl] (known) | 0.1 | 0 |
| (2) $(CH_3O)_2P(S)-O-$[4-CN-5-SCH$_3$-1-methyl-pyrazol-3-yl] | 0.1 / 0.01 | 100 / 60 |
| (1) $(C_2H_5O)_2P(S)-O-$[4-CN-5-SCH$_3$-1-methyl-pyrazol-3-yl] | 0.1 / 0.01 | 100 / 40 |
| (3) $(C_2H_5O)_2P(O)-O-$[4-CN-5-SCH$_3$-1-methyl-pyrazol-3-yl] | 0.1 / 0.01 / 0.001 | 100 / 100 / 70 |
| (4) $CH_3(iC_3H_7O)P(S)-O-$[4-CN-5-SCH$_3$-1-methyl-pyrazol-3-yl] | 0.1 / 0.01 | 100 / 100 |
| (5) $C_2H_5O(C_2H_5)P(S)-O-$[4-CN-5-SCH$_3$-1-methyl-pyrazol-3-yl] | 0.1 / 0.01 | 100 / 100 | compounds, the evaluation times and the results can be seen from the following Table 2.

TABLE 2
Myzus Test

| Active compound (constitution) | Concentration of active compound in percent | Degree of destruction in percent after 24 hours |
|---|---|---|
| (A) $(CH_3O)_2P(S)-O-$[3-methyl-pyrazol-5-yl] (known) | 0.1 | 0 |
| (B) $(C_2H_5O)_2P(S)-O-$[3-methyl-pyrazol-5-yl] (known) | 0.1 / 0.01 | 100 / 30 |
| (2) $(CH_3O)_2P(S)-O-$[4-CN-5-SCH$_3$-1-methyl-pyrazol-3-yl] | 0.1 / 0.01 / 0.001 | 100 / 100 / 99 |
| (1) $(C_2H_5O)_2P(S)-O-$[4-CN-5-SCH$_3$-1-methyl-pyrazol-3-yl] | 0.1 / 0.01 / 0.001 | 100 / 100 / 90 |
| (3) $(C_2H_5O)_2P(O)-O-$[4-CN-5-SCH$_3$-1-methyl-pyrazol-3-yl] | 0.1 / 0.01 / 0.001 / 0.0001 | 100 / 100 / 99 / 55 |
| (4) $CH_3(iC_3H_7O)P(S)-O-$[4-CN-5-SCH$_3$-1-methyl-pyrazol-3-yl] | 0.1 / 0.01 / 0.001 / 0.0001 | 100 / 100 / 99 / 45 |
| (5) $C_2H_5O(C_2H_5)P(S)-O-$[4-CN-5-SCH$_3$-1-methyl-pyrazol-3-yl] | 0.1 / 0.01 / 0.001 / 0.0001 | 100 / 100 / 99 / 60 |

EXAMPLE 2

*Myzus test* (contact action)
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active

EXAMPLE 3

*Tetranychus test*
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 10% means that all the spider mites are killed whereas 0% means that none of the spider mites are killed.

The active compounds, the concentrations of the active compounds, the evaluation times and the results can be seen from the following Table 3.

TABLE 3
*Tetranychus urticae* test

| Active compound (constitution) | Concentration of active compound in percent | Degree of destruction in percent after 2 days |
|---|---|---|
| (A) $(CH_3O)_2\overset{S}{\underset{\|}{P}}-O-\underset{\underset{H}{N}}{\overset{N}{\diagup}}\diagdown-CH_3$ (known) | 0.1 | 0 |
| (B) $(C_2H_5O)_2\overset{S}{\underset{\|}{P}}-O-\underset{\underset{H}{N}}{\overset{N}{\diagup}}\diagdown-CH_3$ (known) | 0.1 | 0 |
| (2) $(CH_3O)_2\overset{S}{\underset{\|}{P}}-O-\underset{N-N-CH_3}{\overset{CN}{\diagup}}\diagdown-SCH_3$ | 0.1<br>0.01 | 100<br>100 |
| (1) $(C_2H_5O)_2\overset{S}{\underset{\|}{P}}-O-\underset{N-N-CH_3}{\overset{CN}{\diagup}}\diagdown-SCH_3$ | 0.1<br>0.01<br>0.001 | 100<br>100<br>40 |
| (3) $(C_2H_5O)_2\overset{O}{\underset{\|}{P}}-O-\underset{N-N-CH_3}{\overset{CN}{\diagup}}\diagdown-SCH_3$ | 0.1<br>0.01 | 100<br>70 |
| (4) $\underset{iC_3H_7O}{\overset{CH_3}{\diagdown}}\overset{S}{\underset{\|}{P}}-O-\underset{N-N-CH_3}{\overset{CN}{\diagup}}\diagdown-SCH_3$ | 0.1<br>0.01<br>0.001 | 100<br>100<br>100 |
| (5) $\underset{C_2H_5O}{\overset{C_2H_5}{\diagdown}}\overset{S}{\underset{\|}{P}}-O-\underset{N-N-CH_3}{\overset{CN}{\diagup}}\diagdown-SCH_3$ | 0.1<br>0.01 | 100<br>100 |

EXAMPLE 4

Tetranychus test/resistant

Solvent: 3 parts by weight acetone
Emulsifier: 1 part by weight alkylaryl polyglycol ether To produce a suitable preparation of active compound 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4.

TABLE 4
*Tetranychus urticae* test/resistant

| Active compound (constitution) | Concentration of active compound in percent | Degree of destruction in percent after 48 hours |
|---|---|---|
| (C) 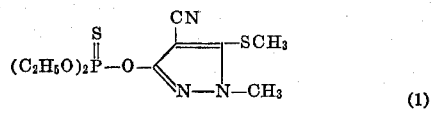 (known) | 0.05<br>0.02<br>0.01<br>0.004 | 95<br>70<br>10<br>0 |
| (1) $\underset{C_2H_5O}{\overset{C_2H_5O}{\diagdown}}\overset{S}{\underset{\|}{P}}-O-\underset{N-N-CH_3}{\overset{CN}{\diagup}}\diagdown-SCH_3$ | 0.05<br>0.02<br>0.01<br>0.004 | 100<br>100<br>100<br>95 |

The following further examples are set forth to illustrate, without limitation, the process for producing the active compounds according to the present invention.

EXAMPLE 5

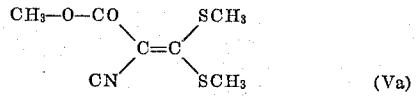

51 g. (0.3 mole) of 1-methyl-3-hydroxy-4-cyano-5-methylmercaptopyrazole and 45 g. potassium carbonate are heated in 500 ml. of acetone together with 57 g. of O,O-diethylthionophosphoric acid diester chloride to 80° C. for 12 hours. The reaction mixture is then poured into water and taken up with benzene. The benzene phase is dried, the solvent is evaporated and the residue is slightly distilled. The yield is 73 g. (=76% of the theory). The O,O-diethyl-O-[1 - methyl - 4 - cyano-5-methylmercaptopyrazol-(3)-yl]-thionophosphoric acid ester possesses a refractive index $n_D^{21}$ of 1.5250.

Calc. for $C_{10}H_{16}O_3N_3S_2P$ (molecular weight 321) (percent): N, 13.10; S, 19.90; P, 9.65. Found (percent): N, 12.95; S, 19.33; P, 10.02.

The 1-methyl-3-hydroxy-4-cyano-5-methylmercaptopyrazole required as starting material can be obtained for example as follows:

80 g. (0.4 mole) of the compound of the following formula $$\underset{CN}{\overset{CH_3-O-CO}{\diagdown}}C=C\underset{SCH_3}{\overset{SCH_3}{\diagup}} \qquad (Va)$$

(prepared according to "Chemische Berichte," vol. 95 (1962), pages 2861 and 2870) by reacting methyl cyanoacetate with carbon disulfide in the presence of an alkali, followed by reaction with two moles of methyl halide are heated in 500 ml. of dry ethanol together with 18 g. of methylhydrazine to 70 to 75° C. for 30 minutes. The mixture is then diluted with water and the reaction product is allowed to crystallize out. The yield is 52 g. (=65% of the theory); the melting point is 212° C.

Calc. for $C_6H_7ON_3S$ (molecular weight 169) (percent): N, 24.80; S, 18.9. Found (percent): N, 24.63; S, 18.8.

In manner analogous with that described above, the following compounds according to the invention can be prepared:

| Formula | Physical properties (Refractive index) |
|---|---|
| (3) 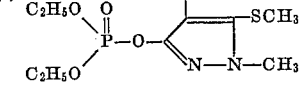 | $n_D^{22} = 1.5035$ |
| (5) 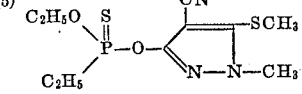 | $n_D^{22} = 1.5450$ |
| (2) 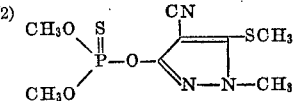 | $n_D^{22} = 1.5470$ |
| (6) 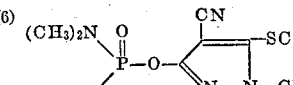 | $n_D^{20} = 1.5262$ |
| (4) 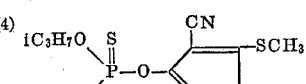 | $n_D^{22} = 1.5421$ |

It will be realized that all of the foregoing compounds contemplated by the present invention possess the desired selective pesticidal, especially arthropodicidal, i.e. insecticidal or acaricidal, and sometimes rodenticidal, properties for combating insects and acarids, and that such compounds have a low phytotoxicity and a correspondingly low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A pyrazolyl ester of the formula

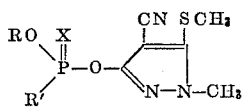

(1)

in which

R denotes alkyl of from 1 to 6 carbon atoms,
R' denotes alkyl of from 1 to 6 carbon atoms or lower alkoxy, and
X denotes oxygen or sulphur.

2. An ester according to claim 1 in which R and R' are alkyl of from 1 to 4 carbon atoms.

3. Compound according to claim 1 wherein such compound is O,O-diethyl-O-[1-methyl-4-cyano-5-methylmercapto-pyrazol-(3)-yl]-thionophosphoric acid ester of the formula

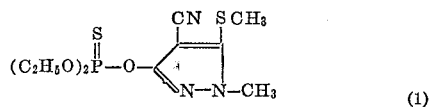

(1)

4. Compound according to claim 1 wherein such compound is O,O-diethyl-O-[1-methyl-4-cyano-5-methylmercapto-pyrazol-(3)-yl]-phosphoric acid ester of the formula

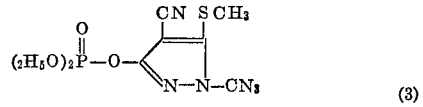

(3)

5. Compound according to claim 1 wherein such compound is O-ethyl-O-[1-methyl-4-cyano-5-methylmercapto-pyrazol-(3)-yl]-ethanethionophosphonic acid ester of the formula

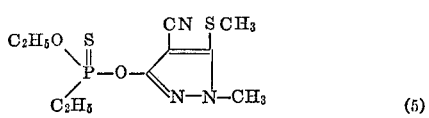

(5)

6. Compound according to claim 1 wherein such compound is O,O-dimethyl - O - [1-methyl-4-cyano-5-methylmercapto-pyrazol-(3)-yl]-thionophosphoric acid ester of the formula

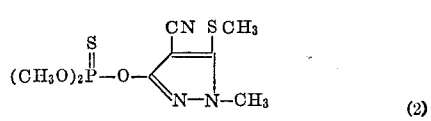

(2)

7. Compound according to claim 1 wherein such compound is O-isopropyl-O-[1-methyl-4-cyano-5-methylmercapto - pyrazol - (3) - yl] - methanethionophosphonic acid ester of the formula

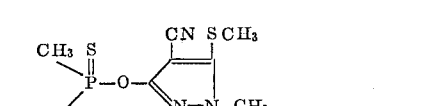

(4)

References Cited

UNITED STATES PATENTS

| 2,754,244 | 7/1956 | O-Ysin et al. | 260—310 R |
| 2,998,426 | 8/1961 | Dickinson et al. | 260—310 R |
| 3,111,525 | 11/1963 | Meltzer et al. | 260—310 R |

FOREIGN PATENTS

| 300,741 | 10/1954 | Switzerland | 260—310 R |
| 300,758 | 10/1954 | Switzerland | 260—310 R |

NATALIE TROUSOF, Primary Examiner

U.S. Cl. X.R.

260—465.4; 424—200

UNITED STATES PATENT OFFICE
CERTIFICATE OF CORRECTION

Patent No. 3,728,297  Dated April 17, 1973

Inventor(s) Hellmut Hoffmann et al.

It is certified that error appears in the above-identified patent and that said Letters Patent are hereby corrected as shown below:

Column 8, line 73, "10%" should read -- 100% --.

Column 12, lines 16 to 18, the formula should appear as shown below:

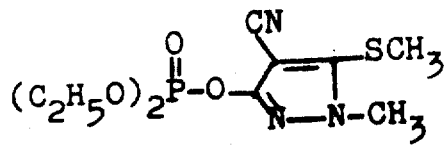

Signed and sealed this 26th day of May 1974.

(SEAL)
Attest:

EDWARD M. FLETCHER, JR.
Attesting Officer

C. MARSHALL DANN
Commissioner of Patents